(12) United States Patent
Zeo et al.

(10) Patent No.: US 9,004,146 B2
(45) Date of Patent: Apr. 14, 2015

(54) ROLLER BLIND DEVICE FOR A MOTOR VEHICLE

(71) Applicants: Gwenole Zeo, Ostfildern (DE); Wolfgang Stark, Ostfildern (DE); Guenter Renz, Ditzingen (DE); Sascha Kircher, Albershausen (DE)

(72) Inventors: Gwenole Zeo, Ostfildern (DE); Wolfgang Stark, Ostfildern (DE); Guenter Renz, Ditzingen (DE); Sascha Kircher, Albershausen (DE)

(73) Assignee: BOS GmbH & Co. KG, Ostfildern (DE)

( * ) Notice: Subject to any disclaimer, the term of this patent is extended or adjusted under 35 U.S.C. 154(b) by 0 days.

(21) Appl. No.: 14/062,089

(22) Filed: Oct. 24, 2013

(65) Prior Publication Data

US 2014/0116631 A1 May 1, 2014

(30) Foreign Application Priority Data

Oct. 25, 2012 (DE) .......................... 10 2012 219 523

(51) Int. Cl.
*B60J 1/20* (2006.01)
*B60J 7/00* (2006.01)

(52) U.S. Cl.
CPC ..................... *B60J 7/0015* (2013.01)

(58) Field of Classification Search
CPC .............................. B60J 7/0015; B60J 1/2052
USPC ......... 160/370.22, 239, 265; 296/214, 216.08
See application file for complete search history.

(56) References Cited

U.S. PATENT DOCUMENTS

| 6,899,380 | B2 * | 5/2005 | Kralik et al. .................. 296/214 |
| 7,793,702 | B2 * | 9/2010 | Biewer et al. ............ 160/370.22 |
| 8,256,492 | B2 * | 9/2012 | Lin ......................... 160/370.22 |
| 8,281,847 | B2 * | 10/2012 | Uehara et al. ........... 160/370.22 |
| 8,770,258 | B2 * | 7/2014 | Kitani et al. ................. 160/265 |
| 2003/0006630 | A1 * | 1/2003 | Kralik et al. .................. 296/214 |
| 2006/0027347 | A1 | 2/2006 | Boehm et al. |
| 2010/0013261 | A1 * | 1/2010 | Takeuchi et al. ............. 296/97.4 |
| 2012/0180961 | A1 * | 7/2012 | Lin ......................... 160/370.22 |
| 2012/0255690 | A1 * | 10/2012 | Zeo et al. ................. 160/370.22 |
| 2013/0049409 | A1 * | 2/2013 | Stark et al. .................... 296/219 |

FOREIGN PATENT DOCUMENTS

| DE | 102 05 117 C1 | 11/2003 |
| DE | 10 2011 007 004 A1 | 10/2012 |
| EP | 1 616 737 A1 | 1/2006 |

OTHER PUBLICATIONS

German Patent Office Search Report issued in Application No. 10 2012 219 523.8, dated Aug. 7, 2013 (5 pages).

* cited by examiner

*Primary Examiner* — Katherine Mitchell
*Assistant Examiner* — Scott Denion
(74) *Attorney, Agent, or Firm* — Flynn, Thiel, Boutell & Tanis, P.C.

(57) ABSTRACT

A roller blind device for a motor vehicle having a flexible roller blind sheet held windably and unwindably on a roller blind shaft, a dimensionally stable pulling-out section assigned to the roller blind sheet at an end area which is at the front in the pulling-out direction, at least one pulling/pushing apparatus continuously rotating and in operative connection with the roller blind shaft and to which the pulling-out section is fastened, and having lateral guide section arrays in which lateral edges of the roller blind sheet are guided. The pulling/pushing apparatus is guided in a guide track integrated in the guide section array and transversely movable together with the guide section array for setting of the function position, in particular before initial operation.

13 Claims, 5 Drawing Sheets

ROLLER BLIND DEVICE FOR A MOTOR VEHICLE

CROSS REFERENCE TO RELATED APPLICATION

This application claims priority from German Application No. 10 2012 219 523.8, filed Oct. 25, 2012, the disclosure of which is hereby incorporated by reference in its entirety into this application.

FIELD OF THE INVENTION

The invention relates to a roller blind device for a motor vehicle, in particular as a sun blind in the area of a vehicle roof, having a flexible roller blind sheet held windably and unwindably on a roller blind shaft rotatably mounted on a support frame, a dimensionally stable pulling-out section assigned to the roller blind sheet at an end area which is at the front in the pulling-out direction, at least one pulling/pushing means continuously rotating parallel to a pulling-out direction and in operative connection with the roller blind shaft and to which the pulling-out section is fastened, and lateral guide section arrays in which lateral edges of the roller blind sheet are guided, with at least one guide section array for tensioning of the roller blind sheet being adjustable transversely to the pulling-out direction, in particular before initial operation, and fixably arranged in a set function position.

BACKGROUND OF THE INVENTION

A roller blind device for shade in a sliding roof of a motor vehicle is provided in EP 1 616 737 A1. The roller blind device has a flexible roller blind sheet held windably and unwindably on a winding shaft and provided at its front end area—when seen in the pulling-out direction—with a dimensionally stable pulling-out section. The roller blind sheet can be moved manually or using a motor between a pulled-out function position and a rolled-up rest position. To allow the roller blind sheet to be kept tensioned transversely to the pulling-out direction, and accordingly prevent sagging of the roller blind sheet, thin metal or plastic strips are assigned to the opposite lateral edges of the roller blind sheet and are guided in guide section arrays. The guide section array on each side is connected to a support frame in an elastically yielding manner by means of a connecting section fixed on the vehicle roof side. The elastically yielding connecting sections are elastically pretensioned in the function position of the roller blind sheet, in which the metal or plastic strips are guided inside the guide section arrays, so that a tensioning effect is exerted on the roller blind sheet transversely to the pulling-out direction.

SUMMARY OF THE INVENTION

The object of the invention is to provide a roller blind device of the type mentioned at the outset which is of simple and functional design.

This object is achieved by the features of Claim 1 and in particular in that the pulling/pushing means is guided in a guide track integrated in the guide section array and transversely movable together with the guide section array for setting the function position, in particular before initial operation. In particular, a groove-like or a web-like guide profiling is provided as the guide track. It is sufficient for the invention that a corresponding pulling/pushing means is provided only on one side for drive transmission between the pulling-out section and the roller blind shaft. For better synchronization of the parallel movement of the pulling-out section, however, two pulling/pushing means are preferably provided, each of which is guided in a guide track of a guide section array on opposite sides of the roller blind sheet. The at least one guide section array extends preferably over an entire pulling-out distance of the roller blind sheet/pulling-out section. The at least one guide section array is arranged adjustable relative to the support frame. The support frame supports the roller blind device and is used to fasten the entire structural unit at an appropriate point in the motor vehicle, in particular in the area of a transparent and movable roof part. The transversely movable guide section array can in one variant remain movable relative to the support frame after initial operation and fitting in the motor vehicle. An actuating drive or an elastic mounting formed by springs or a similar arrangement is then preferably assigned to the guide section array. In another variant, adjustability and movability of the at least one guide section array transversely to the pulling-out direction of the roller blind sheet and relative to the support frame is possible only during a pre-assembly process before initial operation. In this pre-assembly process, the transverse tension of the roller blind sheet is then set by appropriate adjustment and alignment of the at least one guide section array. Then the at least one transversely movable guide section array is fixed relative to the support frame in the set function position in which the roller blind sheet is tensioned, in order to then fasten the roller blind device by means of its support frame to an appropriate bodywork part of the motor vehicle. The solution in accordance with the invention includes both embodiments. The solution in accordance with the invention is suitable in a particularly advantageous manner for a roller blind device which is provided as a sun blind in the area of a vehicle roof, in particular in the area of a transparent roof section. The transparent roof section can be permanently integrated into the roof structure or be designed as a sliding/lifting roof.

In an embodiment of the invention, a deflection pulley is assigned non-rotatably to the roller blind shaft on at least one end face, around which pulley the pulling/pushing means is positioned, where the deflection pulley is arranged movable coaxially or axis-parallel to a rotary axis of the roller blind shaft together with the guide section array and transversely to the pulling-out direction of the roller blind sheet. Hence the deflection pulley is adjusted together with the guide section array, so that the deflection pulley remains, regardless of the setting position of the guide section array, aligned relative to the roller blind sheet in an orbit for the pulling/pushing means which is defined by the guide track.

In a further embodiment of the invention, the deflection pulley is—relative to the rotary axis of the roller blind shaft—connected to the roller blind shaft in an axially displaceable manner. The corresponding connection between the deflection pulley and the roller blind shaft is thus displaceable in a non-rotatable and axial manner, which is preferably achievable by corresponding axial toothed profiling between a roller blind shaft extension on one side and the deflection pulley on the other side.

In a further embodiment of the invention, at least one driver permanently connected to the guide section array is provided and drives the deflection pulley in an axially positive manner in respect of its axial movement. The driver is in any case provided on an inside of the deflection pulley facing the roller blind shaft, in order to drive the deflection pulley transversely outwards during adjustment of the guide section array including the guide track. To achieve a following movement of the deflection pulley not only outwards, but also inwards in the event of yielding, i.e. towards the center of the roller blind sheet, a further driver can be provided which flanks the deflection pulley on the outside, i.e. on a side facing away from the roller blind shaft.

In a further embodiment of the invention, a positively or non-positively effective pulling/pushing belt is provided as the pulling/pushing means and is guided in a guide groove of the guide section array parallel to the pulling-out direction of the roller blind sheet, and the at least one driver is aligned with at least one longitudinal edge of the guide groove. The guide groove acts as a guide track in the meaning of the invention. A toothed belt or a perforated strip can be provided as the pulling/pushing belt with positive effect, with the deflection pulley having radially outward-projecting profiling corresponding to the toothed or perforated profiling. A Vee-belt or a continuous belt of rectangular cross-section can be provided as the pulling/pushing section with non-positive function, with the deflection pulley having in the area of its outer circumference—like the guide track—a corresponding track contour and a complementary guide cross-section for the corresponding pulling/pushing belt.

In a further embodiment of the invention, two web shoulders flanking the deflection pulley on both sides are provided as drivers and are aligned with or parallel to the longitudinal edges limiting the guide groove. This allows a central rotation plane of the deflection pulley to be provided at least largely in alignment with the plane defined by the central longitudinal axes of upper and lower guide tracks for the pulling/pushing belt of the guide section array.

In a further embodiment of the invention, the web shoulders are integrated in an end section of the guide section array. The end section is fastened detachably or non-detachably to the guide section array or is integrally cast in one piece on the guide section array.

In a further embodiment of the invention, means for fixing the at least one guide section array relative to the support frame are provided. The means for fixing can be designed as screw connections or as other mechanical fastening means. The means for fixing serves to secure a function position, once it has been set, of the at least one guide section array transversely to the pulling-out direction of the roller blind sheet, in which a required transverse tension of the roller blind sheet is achieved that prevents sagging of the roller blind sheet in the pulled-out function state.

In a further embodiment of the invention, means are provided for axial adjustment of the deflection pulley before initial operation, and at least one means for axial fixing of the deflection pulley in the pre-adjusted axial position for initial operation. This embodiment avoids the permanent arrangement of the deflection pulley between drivers. By dispensing with the drivers for the roller blind device after initial operation of this roller blind device, the roller blind device can be of simpler design, and hence less expensive. The means for axial adjustment are advantageously assigned to a setting device in which the roller blind device is adjusted before initial operation, so that a sufficient transverse tension is applied to the roller blind sheet in particular to prevent sagging of the latter. At the same time, the pulling/pushing means together with the at least one deflection pulley and the associated guide tracks of the pulling/pushing means are also adjusted. The at least one means for axial fixing of the deflection pulley after pre-setting remains by contrast on the roller blind device to prevent the deflection pulley moving back out of the pre-set axial position. The means for fixing can be in the form of a press fit between the deflection pulley and its pulley hub coaxial with the roller blind shaft, or also by other positive or bonding means, such as in particular an adhesive coating between the deflection pulley and the pulley hub.

In a further embodiment of the invention, the means for axial adjustment are removed for initial operation of the roller blind device. Since the means for axial adjustment of the deflection pulley are assigned to the setting device, from which the roller blind device is removed after appropriate pre-setting, the at least one means for axial adjustment of the roller blind device is also inevitably removed for initial operation.

Further advantages and features of the invention can be found in the claims and in the following description of a preferred embodiment of the invention, which is illustrated by the drawings.

DETAILED DESCRIPTION

Figure 1A:
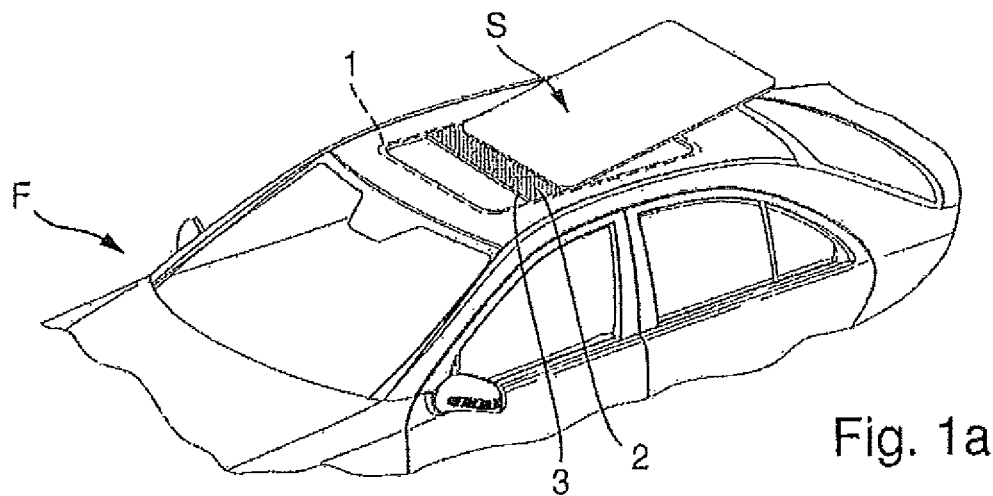
FIG. 1a shows schematically a passenger car with a movable roof section and with an embodiment of a roller blind device in accordance with the invention fitted in the roof area.
Figure 1B:
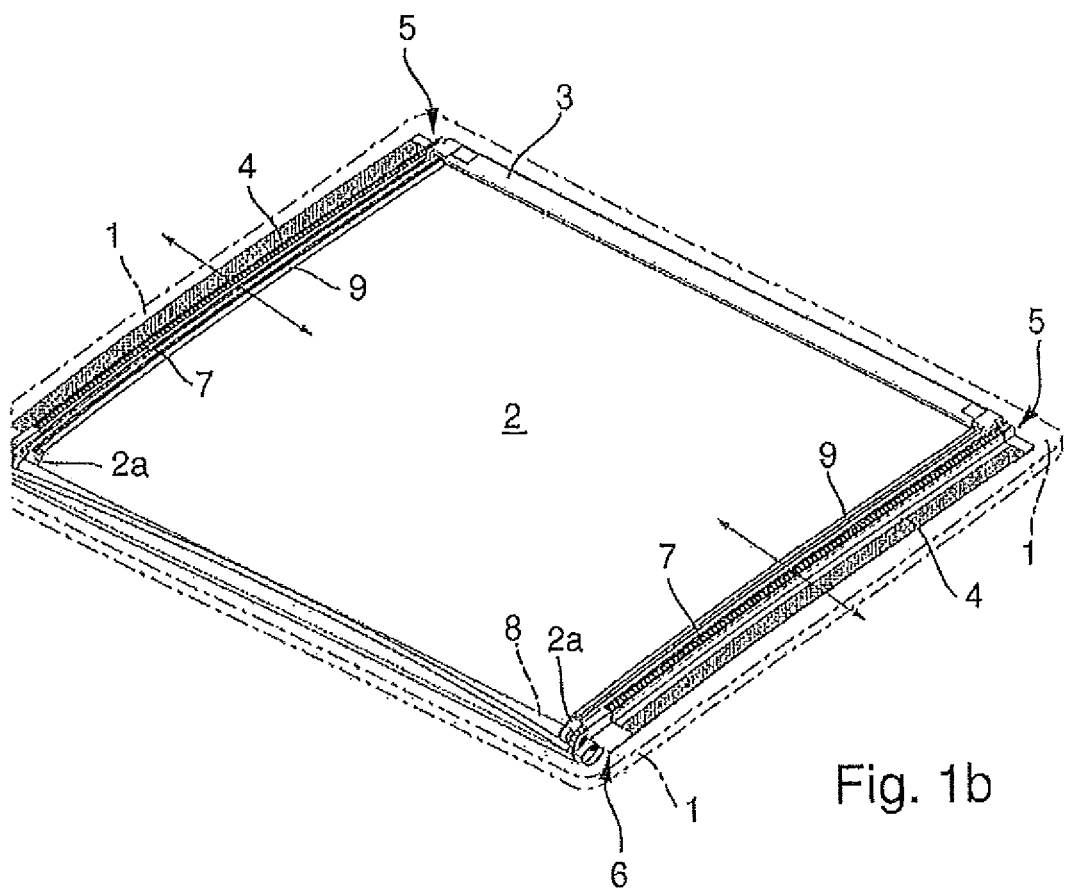
FIG. 1b shows in an enlarged perspective view the roller blind device according to FIG. 1a, FIG. 2 shows in an enlarged view a section of the roller blind device according to FIG. 1b.
Figure 2:
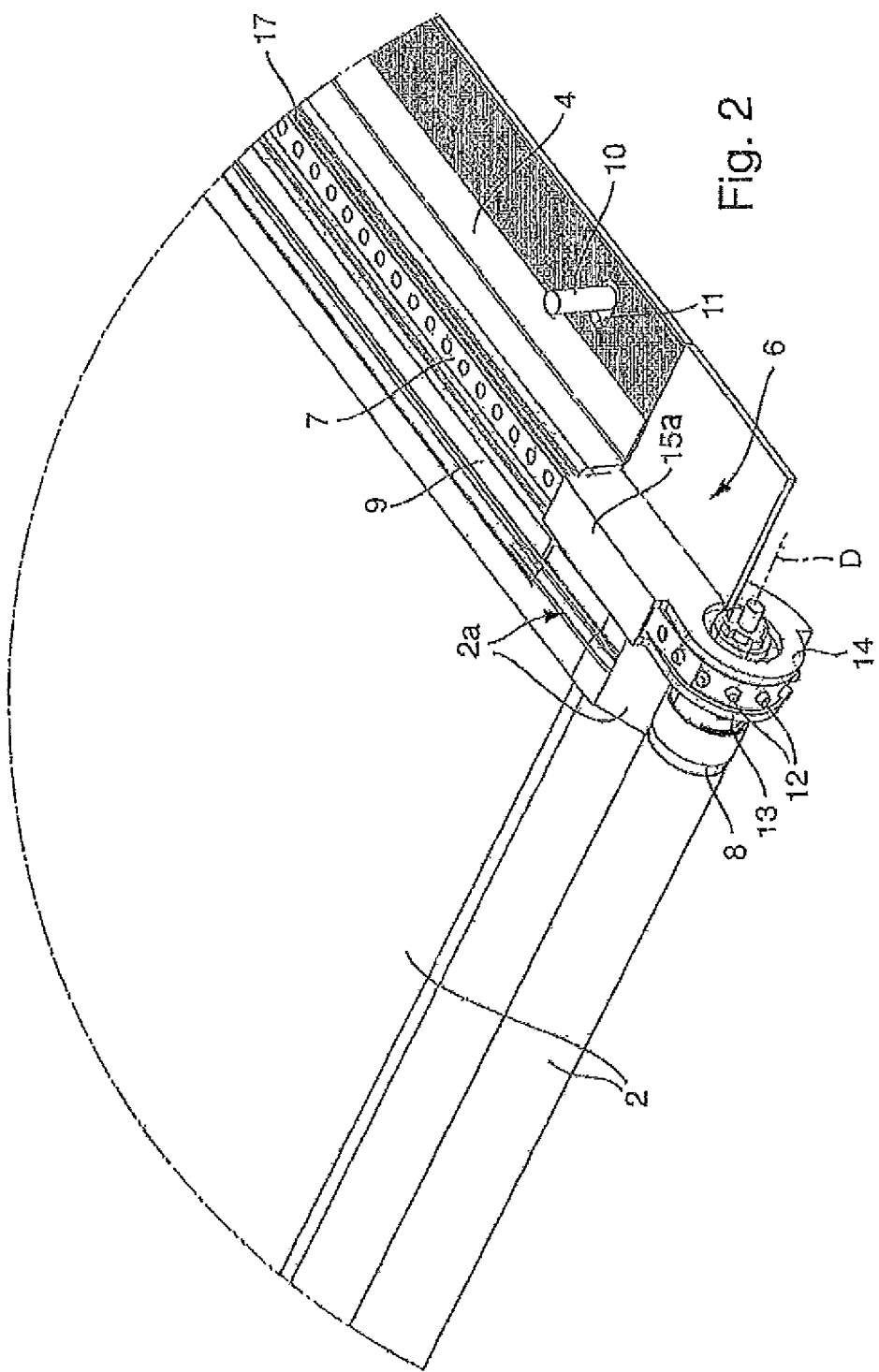
Figure 3:
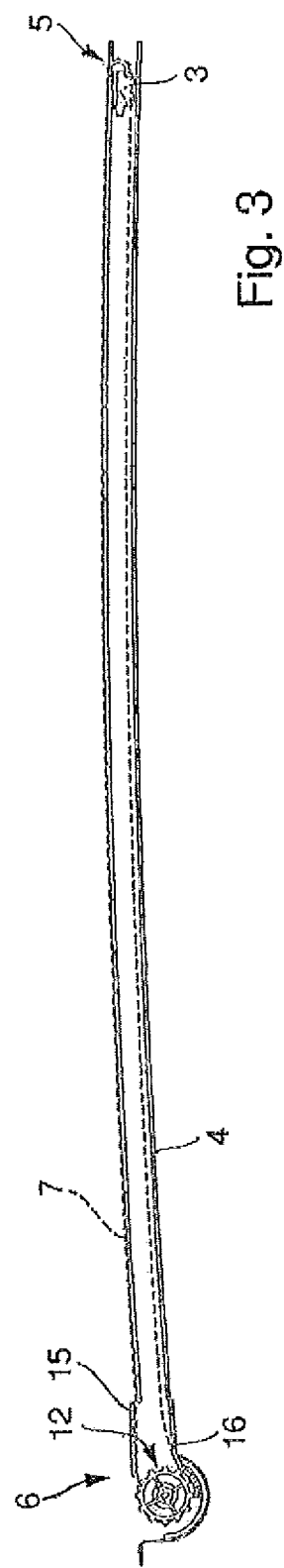
FIG. 3 shows in a longitudinal sectional view the roller blind device according to FIG. 1b.

A motor vehicle in the form of a passenger car F has in a roof area a roof section which is closable by a movable roof part, in the present invention in the form of a sliding/lifting roof S. The sliding/lifting roof is movable by an electric motor. The sliding/lifting roof S consists of glass and is transparent in the embodiment shown.

For providing shade to the roof section, a roller blind device 1 to 3 is additionally provided which is assigned to the roof section. The roller blind device has a support frame 1 which is permanently connected in an edge area of the roof section to appropriate bodywork parts of the roof area of the passenger car. The support frame 1 is designed substantially rectangular. A roller blind shaft 8, on which a flexible planar structure in the form of a roller blind sheet 2 consisting of a textile fabric or a plastic film is windably and unwindably held, is rotatably mounted on the support frame 1. The roller blind shaft is—relative to a function state of the support frame 1 fitted in the roof area—mounted on a rear edge area of the support frame 1 facing a vehicle rear. A rotary axis D of the roller blind shaft 8 extends in the vehicle transverse direction. The roller blind sheet 2 has, at its front end area in the pulling-out direction, a dimensionally stable pulling-out section or handle section 3 by means of which the roller blind sheet 2 can be manually moved into a pulled-out function position or into a wound-on rest position.

The pulling-out section 3 is mounted at each of its opposite ends in a longitudinally movable manner on a guide section array 4, with the opposite guide section arrays 4 being aligned parallel to one another. The two guide section arrays 4 form guide rails which—as is made clear in FIGS. 1 and 4 to 6 by the double arrows—can be moved parallel to the rotary axis D of the roller blind shaft 8 and hence in the vehicle transverse direction. In the embodiment shown, the guide section arrays 4 are transversely movable relative to the support frame 1 only in a pre-assembly stage, as will be described in the following. Then the guide section arrays 4 are fixed relative to the support frame 1 in the pre-set fitting position.

The adjustability of the guide section arrays 4 serves to tension the roller blind sheet 2 transversely to its pulling-out direction. To do so, the roller blind sheet 2 is provided at its opposite lateral edges with a lateral reinforcement 2*a* in each case, which is guided inside a guide groove 9 of the respective guide section array 4. The guide groove 9 positively grips the lateral reinforcement 2*a* at the respective lateral edge of the roller blind sheet 2 transversely to the pulling-out direction. The guide groove 9 is in one piece with the guide section array 4. An adjustment of the two guide section arrays 4 transversely to the pulling-out direction of the roller blind sheet 2 therefore inevitably leads, due to the lateral reinforcements 2*a* being moved in the guide grooves 9, to tensioning of the roller blind sheet 2 transversely to the pulling-out direction. This prevents any downward sagging of the roller blind sheet 2 due to its dead weight. The tension is selected such that nevertheless a sufficient slidability of the lateral reinforcements 2*a* inside the guide grooves 9, and of the pulling-out section 3 at the guide section arrays 4, is maintained.

To permit winding and unwinding of the roller blind sheet 2 relative to the roller blind shaft 8, movement coupling means are provided between the pulling-out section 3 and the roller blind shaft 8. The movement coupling means each comprise a continuously rotating transmission element or pulling/pushing belt. The two pulling/pushing belts are provided on opposite sides of the pulling-out section 3 and the roller blind shaft 8, and are each formed by a perforated strip belt 7 which is manufactured in one piece out of plastic and slidably guided along a guide track or groove 17 of the respective guide section array 4. As can be discerned from Figures 1*b* and 2 to 6, the perforated strip belt 7 is deflected by around 180° at opposite end areas 5, 6 of the respective guide section array 4. At an end area 5 facing away from the roller blind shaft 8, the respective perforated strip belt 7 is deflected by a semi-circular-curved sliding shoulder. At the end area facing the roller blind shaft 8, the respective perforated strip belt 7 is deflected by a deflection pulley 12, where the two deflection pulleys 12 are designed as cam wheels, of which the cams protruding outwards and radially to the rotary axis D match the form and spacing of the holes in the respective perforated strip belt 7. Both deflection pulleys 12 are coaxially aligned with the roller blind shaft 8 and non-rotatably connected to said roller blind shaft 8. The two perforated strip belts 7 extend parallel to the pulling-out direction of the roller blind sheet 2 in the longitudinal direction of the two guide section arrays 4.

Figure 4:
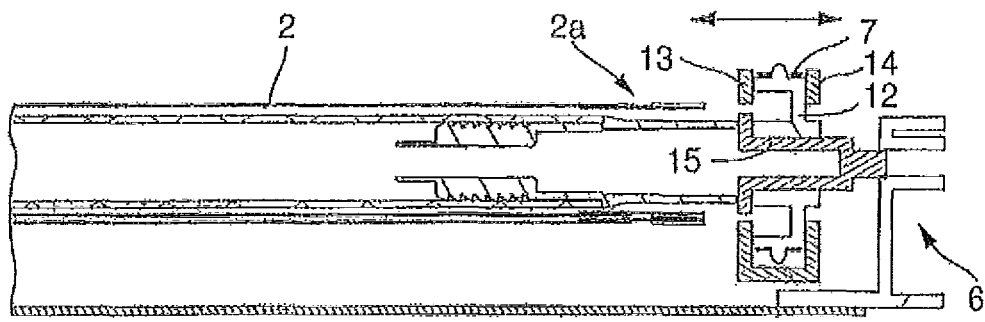
FIG. 4 shows in a cross-sectional view the roller blind device at the level of a roller blind shaft.
Figure 5:
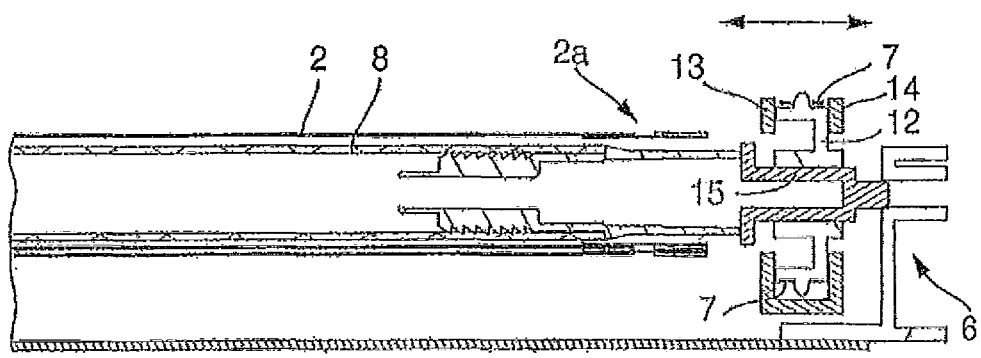
FIG. 5 shows the view according to FIG. 4 with a deflection pulley moved into a central position for the roller blind shaft.
Figure 6:
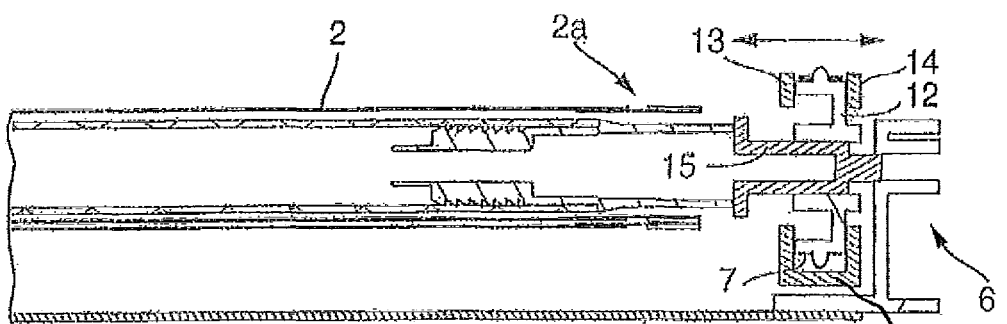
FIG. 6 shows the view from FIGS. 4 and 5 with a deflection pulley moved to an outer end position.

To allow coaxial displacement of the deflection pulleys 12 relative to the rotary axis D during a transverse movement of the guide section arrays 4, by which the perforated strip belts 7 are also moved, each deflection pulley 12 is axially movable on a guide extension 15 of the roller blind shaft 8 additionally to the non-rotatable co-movement. To do so, the guide extension 15 of the roller blind shaft 8 has axial outer profiling, and a hub of each deflection pulley 12 has complementary axial inner profiling. The complementary profilings permit an axial displacement of each deflection pulley 12 on the respective guide extension 15 of the roller blind shaft 8 and at the same time a non-rotatable co-movement between the guide extension 15 and the deflection pulley 12. FIGS. 4 to 6 show a side of the roller blind shaft 8 with the corresponding operative connection to the deflection pulley 12 and to the perforated strip section 7. The opposite end face is designed correspondingly mirror-symmetrical.

To permit a co-movement of each deflection pulley 12 together with the assigned guide section array 4 during an adjustment transverse to the pulling-out direction of the roller blind sheet 2, each deflection pulley 12 is flanked at its opposite end faces by a driver web 13, 14 integrally cast in one piece at the respective end area 6 of the guide section array 4. The end area 6 also has a hold-down 15*a* covering the perforated strip belt 7 and likewise integrally cast in one piece at the end area 6. The hold-down 15*a* is used to hold the perforated strip belt 7 securely on the cams of the deflection pulley 12. Slippage of the perforated strip belt 7, which could lead to detachment and lifting off of the perforated strip belt from the deflection pulley 12, is thereby prevented. The end area 6 also has in the area of its underside a closed guide channel section 16*a* that prevents lifting off of the perforated strip belt 7 from the deflection pulley 12 in the underside area too. Both the guide channel section 16*a* and the hold-down 15*a* form closed channel sections in the inlet and outlet areas of the deflection pulley 12.

As soon as the respective guide section array 4 is moved transversely to the pulling-out direction of the roller blind sheet 2, the respective driver web 13, 14 moves the deflection pulley 12 too, since the driver webs 13, 14 are permanently connected to the end area 6 and hence to the respective guide section array 4. When the guide section arrays 4 are moved laterally outwards, the roller blind sheet 2 is tensioned. In the case of an opposite movement inwards towards the center of the roller blind sheet 2—to reduce a tension—the outer driver web also moves the deflection pulley 12 inwards in a corresponding manner coaxially to the rotary axis D.

The movement and setting of the guide section arrays 4 relative to the support frame 1 is achieved in a manner not shown in detail in a fitting setting device, by means of which sagging and tension of the roller blind sheet 2 are monitored. The two guide section arrays 4 are moved in this pre-assembly setting device transversely to the pulling-out direction until the required tension is achieved.

To permit transverse movement of the guide section arrays 4, they have several slots 11 arranged spread over the length of the respective guide section array 4 and through which protrude fastening elements 10 of the support frame 1. By appropriate fixing of the fastening elements 10, in the present invention in the form of screw connections, the set position of each guide section array 4 relative to the support frame 1 is fixed.

In this set assignment between the guide section arrays 4 and the support frame 1, the entire structural unit of support frame 1, guide section arrays 4 including perforated strip sections 7, roller blind shaft 8 and roller blind sheet 2 with pulling-out section 3, is fitted and fastened in the area of the roof section in the roof area of the passenger car F.

In an embodiment, not shown, of the invention, the guide section arrays 4 are flexibly mounted relative to the support frame 1 even after initial operation, i.e. in the fitted position in the roof area of the passenger car. Corresponding tension or compression spring arrangements, which act on the respective guide section array 4 transversely to the pulling-out direction of the roller blind sheet 2 and are held on the support frame 1, effect permanent loading of the guide section arrays 4 and the correspondingly permanent transverse tension of the roller blind sheet 2.

The pulling-out section 3 is permanently connected to the two opposite perforated strip belts 7. The two perforated strip belts 7 also move the roller blind shaft 8 in both rotation directions via the deflection pulleys 12. A displacement of the pulling-out section 3 both rearwards and forwards—relative to an alignment in passenger car F—accordingly inevitably effects a transmission of the pushing or pulling motion to the deflection pulleys 12 and accordingly a rotation of the roller blind shaft 8, with the result that the roller blind shaft 8 and the roller blind sheet 2 are wound or unwound synchronously with the displacement movement of the pulling-out section 3.

Figure 7:
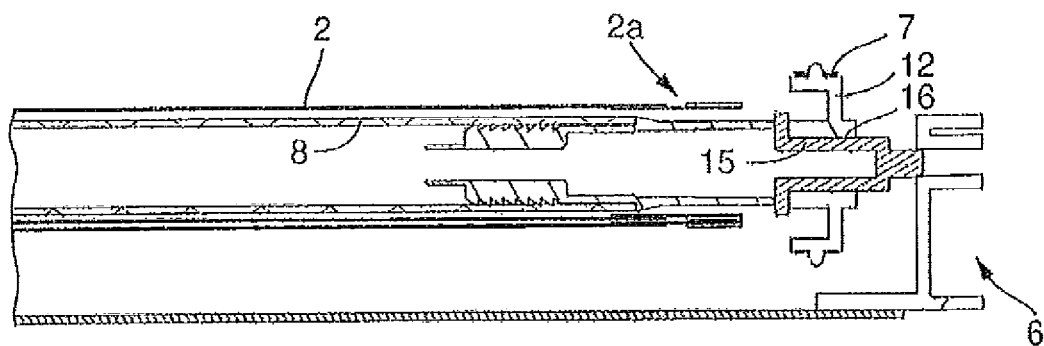
FIGS. 7 to 8 show the views in accordance with FIGS. 4 and 6, where the deflection pulley is axially fixed on an assigned pulley hub in non-positive manner after an axial pre-setting illustrated by the different axial positions.
Figure 8:
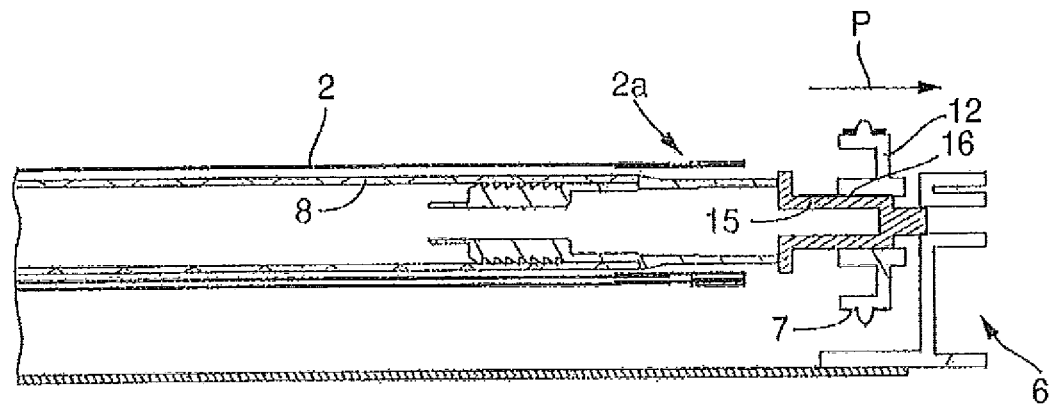

The embodiment shown in FIGS. 7 and 8 of a roller blind device in accordance with the invention corresponds substantially to the previously described embodiment, where the illustrations in FIGS. 7 and 8 match the positions of the deflection pulley 12 in accordance with FIGS. 4 and 6. The main difference is that the axial movement of the deflection pulley 12 together with the guide section arrays and the perforated strip belt 7 is not achieved using drivers and corresponding web shoulders, which are arranged on the respective guide section array and which flank the respective deflection pulley 12; instead the respective deflection pulley 12 is already axially adjusted on the fitting setting device in the embodiment according to FIGS. 7 and 8. The fitting setting device has a corresponding driver which moves and axially adjusts the respective deflection pulley 12 during transverse adjustment of the respective guide section array and of the assigned perforated strip belt in such a way that the deflection pulley is aligned with the corresponding guide track for the perforated strip belt 7. To fix the axial pre-setting of the deflection pulley 12 relative to the guide extension 15 of the roller blind shaft 8, clamping means 16 are provided between the deflection pulley 12 and the guide extension 15. The clamping means 16 can be designed as a suitable transition fit between the inner circumference of the hub of the deflection pulley 12 and the outer circumference of the guide extension 15. The clamping means 16 are designed such that in normal operation of the deflection pulley 12, the pre-set axial adjustment of the deflection pulley 12 relative to the guide extension 15 and hence relative to the roller blind shaft 8 no longer changes. After the pre-setting in the fitting setting device, the roller blind device is removed from the fitting setting device, so that the drivers of the fitting setting device too inevitably move away from the deflection pulley 12, so that the axial alignment of the deflection pulley 12 in accordance with FIG. 8 is obtained for initial operation of the roller blind device. The arrow direction P in FIG. 8 makes clear the direction of the axial adjustment of the deflection pulley in the fitting setting device, starting from the axially inner initial position of the deflection pulley 12 in accordance with FIG. 7, in which the deflection pulley 12 contacts with its hub a radial ring shoulder of the guide extension 15 at its end facing the roller blind shaft 8.

The invention claimed is:

1. A roller blind device for a motor vehicle having a flexible roller blind sheet held windably and unwindably on a roller blind shaft mounted on a support frame for rotation about a rotational axis, a pulling-out section attached to the roller blind sheet at an end area thereof which is spaced from the roller blind shaft, at least one transmission element continuously rotating parallel to a pulling-out direction of the roller blind sheet and in operative connection with the roller blind shaft and to which at least one transmission element the pulling-out section is fastened, the pulling-out direction being oriented transversely to the rotational axis, and lateral guide section arrays in which lateral edges of the roller blind sheet are guided, at least one guide section array being adjustable transversely to the pulling-out direction, for tensioning of the roller blind sheet before initial operation of the roller blind device, and fixably arranged in a set function position, the at least one transmission element being guided in a guide track integrated with the at least one guide section array and transversely movable together with the at least one guide section array for setting of the function position before initial operation of the roller blind device, the roller blind device further having a deflection pulley non-rotatably attached to the roller blind shaft on an end face thereof, the at least one transmission element being positioned around the deflection pulley, wherein the deflection pulley and the at least one guide section array are movable together in a direction transverse to the pulling-out direction of the roller blind sheet.

2. The roller blind device according to claim 1, wherein the deflection pulley is—connected to the roller blind shaft so as to be axially displaceable relative to the roller blind shaft in a direction coaxial to or substantially parallel to the rotational axis of the roller blind shaft.

3. The roller blind device according to claim 1, further including at least one driver permanently connected to the at least one guide section array, the at least one driver being disposed to drive the deflection pulley together with the at least one guide section array in the direction transverse to the pulling-out direction.

4. The roller blind device according to claim 3, wherein a positively or non-positively effective belt is provided as the at least one transmission element and is guided in the guide track of the at least one guide section array parallel to the pulling-out direction of the roller blind sheet, and the at least one driver is aligned with a longitudinal edge of the guide track.

5. The roller blind device according to claim 3, wherein the at least one driver includes two drivers and web shoulders flanking the deflection pulley on both sides are provided as the respective drivers and are aligned with or parallel to longitudinal edges of the at least one guide section array limiting the guide groove.

6. The roller blind device according to claim 5, wherein the web shoulders are integrated into an end section of the at least one guide section array.

7. The roller blind device according to claim 1, wherein the at least one guide section array is fixed relative to the support frame.

8. The roller blind device according to claim 1, wherein the deflection pulley is clamped to a guide extension of the roller blind shaft in a predefined and fixed axial position before initial operation of the roller blind device.

9. A roller blind device for use adjacent a roof area of a motor vehicle, said device comprising:
   a support frame;
   a roller blind shaft mounted for rotation on said support frame about a rotational axis;
   a flexible roller blind sheet mounted on said roller blind shaft and being windable around said roller blind shaft into a wound-up rest position and unwindable from said roller blind shaft in a pull-out direction into an at least partially extended functional position, the pull-out direction being oriented transversely to the rotational axis of said roller blind shaft, said roller blind sheet having a first end disposed adjacent said roller blind shaft, a second end spaced from said first end and a pair of lateral edges oriented substantially parallel to the pull-out direction;
   a handle section attached to said second end of said roller blind sheet;
   at least one transmission element fastened to said handle section and operatively connected to said roller blind shaft, said at least one transmission element being rotatable in a direction substantially parallel to the pull-out direction of said roller blind sheet;

a pair of lateral guide sections disposed on opposite sides of said roller blind sheet in which the respective said lateral edges of said roller blind sheet are guided, at least one of said guide sections including a guide track in which said at least one transmission element is guided, said at least one guide section being adjustably movable into a set functional position in a direction transverse to the pull-out direction for adjusting a tension of said roller blind sheet; and a deflection pulley attached to said roller blind shaft adjacent one end thereof for rotation with said roller blind shaft about the rotational axis and said at least one transmission element being disposed around said deflection pulley, said deflection pulley, said at least one guide section, said guide track and said at least one transmission element all being movable together in the direction transverse to the pull-out direction.

10. The roller blind device according to claim 9, wherein said deflection pulley is attached to said roller blind shaft for movement relative to said roller blind shaft in the direction transverse to the pull-out direction.

11. The roller blind device according to claim 10, wherein said at least one guide section includes a pair of drivers disposed on opposite sides of said deflection pulley to drive said deflection pulley together with said at least one guide section in the direction transverse to the pull-out direction.

12. The roller blind device according to claim 11, wherein said at least one transmission element comprises a belt and said belt is guided in said guide track in the direction substantially parallel to the pull-out direction and transversely to the rotational axis, and each said driver is aligned with a longitudinal edge of said guide track.

13. The roller blind device according to claim 12, wherein said drivers define respective outer sideward limits of said guide track.

* * * * *